United States Patent
Luo et al.

(10) Patent No.: US 9,106,389 B2
(45) Date of Patent: Aug. 11, 2015

(54) INTERFERENCE RANDOMIZATION FOR UPLINK SIGNALING

(75) Inventors: Xiliang Luo, Cardiff, CA (US); Peter Gaal, San Diego, CA (US); Wanshi Chen, San Diego, CA (US); Hao Xu, San Diego, CA (US); Tao Luo, San Diego, CA (US); Kapil Bhattad, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 13/332,701

(22) Filed: Dec. 21, 2011

(65) Prior Publication Data

US 2012/0163159 A1 Jun. 28, 2012

Related U.S. Application Data

(60) Provisional application No. 61/426,631, filed on Dec. 23, 2010.

(51) Int. Cl.
*H04L 5/00* (2006.01)
*H04L 1/16* (2006.01)

(52) U.S. Cl.
CPC ............ *H04L 5/0062* (2013.01); *H04L 1/1692* (2013.01)

(58) Field of Classification Search
CPC .................................................... H04L 27/265
See application file for complete search history.

(56) References Cited

U.S. PATENT DOCUMENTS

| | | | |
|---|---|---|---|
| 8,437,332 B2 * | 5/2013 | Wang et al. ................. | 370/347 |
| 2007/0104285 A1 | 5/2007 | Chan et al. | |
| 2008/0165893 A1 | 7/2008 | Malladi et al. | |
| 2009/0175159 A1 * | 7/2009 | Bertrand et al. ............. | 370/203 |
| 2009/0249027 A1 | 10/2009 | Kim et al. | |

(Continued)

FOREIGN PATENT DOCUMENTS

| | | |
|---|---|---|
| CN | 101079662 A | 11/2007 |
| CN | 101227233 A | 7/2008 |

(Continued)

OTHER PUBLICATIONS

Interdigital Communications et al., "Inter-cell Interference Randomization for PUCCH Format 3", 3GPP Draft; R1-110111, 3rd Generation Partnership Project (3GPP), Mobile Competence Centre ; 650, Route Des Lucioles ; F-06921 Sophia-Antipolis Cedex ; France, vol. RAN WG1, no. Dublin, Ireland; 20110117, Jan. 11, 2011, XP050490075, [retrieved on Jan. 11, 2011]* sections 1 and 2 *.

(Continued)

*Primary Examiner* — Hassan Phillips
*Assistant Examiner* — Prenell Jones
(74) *Attorney, Agent, or Firm* — Austin Rapp & Hardman

(57) ABSTRACT

A method for transmitting an acknowledgement/negative acknowledgement is described. Cell-specific symbol-level cyclic shift hopping is applied to data single-carrier frequency division multiplexing symbols of the acknowledgement/negative acknowledgement. A discrete Fourier transform is applied to the data single-carrier frequency division multiplexing symbols. Cell-specific symbol-level phase hopping is applied to the data single-carrier frequency division multiplexing symbols. The data single-carrier frequency division multiplexing symbols are transmitted in a slot.

32 Claims, 10 Drawing Sheets

(56) References Cited

U.S. PATENT DOCUMENTS

| | | | |
|---|---|---|---|
| 2010/0195702 A1* | 8/2010 | Nakao et al. | 375/140 |
| 2010/0246637 A1* | 9/2010 | Miyatani | 375/130 |
| 2011/0164532 A1* | 7/2011 | Kawamura et al. | 370/254 |
| 2011/0188447 A1 | 8/2011 | Wang et al. | |
| 2011/0235599 A1 | 9/2011 | Nam et al. | |
| 2013/0155988 A1* | 6/2013 | Bertrand et al. | 370/329 |
| 2013/0286975 A1* | 10/2013 | Nakao et al. | 370/329 |
| 2013/0301538 A1* | 11/2013 | Muharemovic et al. | 370/329 |

FOREIGN PATENT DOCUMENTS

| | | |
|---|---|---|
| CN | 101296513 A | 10/2008 |
| WO | WO2011014019 A2 | 2/2011 |

OTHER PUBLICATIONS

Interdigital Communications et al, "Evaluation of inter-cell interference issues for PUCCH Format 3", 3GPP Draft; R1-106477, 3rd Generation Partnership Project (3GPP), Mobile Competence Centre ; 650, Route Des Lucioles ; F-06921 Sophia-Antipolis Cedex ; France, vol. RAN WG1, no. Jacksonville, USA; 20101115, Nov. 19, 2010, XP050489912, [retrieved on 2010-11-191 * section 2 and section 4 *.

Interdigital Communications et al, "OCC Remapping for PUCCH Format 3", 3GPP Draft; R1-110110, 3rd Generation Partnershi P Project (3GPP) , Mobile Competence Centre ; 650, Route Des Lucioles ; F-06921 Sophia-Antipolis Cedex ; France, vol. RAN WG1, no. Dublin, Ireland; 20110117, Jan. 11, 2011, XP050490074, [retrieved on Jan. 11, 2011]* section 2 *.

International Search Report and Written Opinion—PCT/US2011/066906—ISA/EPO—Mar. 28, 2012.

QUALCOMM Europe: "Hopping o f UL DM-RS", 3GPP Draft; R1-080963, 3rd Generation Partnership Project (3GPP) , Mobile Competence Centre; 650, Route Des Lucioles ; F-06921 Sophia-Antipolis Cedex; France, Vol. RAN WG1, no. Sorrento, Italy; 20080215, Feb. 15, 2008, XP050109434, [retrieved on Feb. 15, 2008]* sections 2-4 *.

Ericsson, "Introduction of Rel-10 LTE-Advanced features in 36.211", 3GPP TSG-RAN Meeting #62, Madrid, Spain, Aug. 23-27, 2010, R1-105096, pp. 50.

QUALCOMM Incorporated, 3GPP DRAFT: R1-105555 "Further details of PUCCH format 3," 3GPP TSG-RAN WG1 #62bis, Oct. 11-15, 2010, Xi'an, China, 10 pages.

Ericsson, "E-UTRA downlink scrambling", 3GPP Draft; R1-060083, 3rd Generation Partnership Project (3GPP), Mobile Competence Centre ; 650, Route Des Lucioles ; F-06921 Sophia-Antipolis Cedex; France, vol. RAN WG1, no. Helsinki, Finland; 20060119, Jan. 19, 2006, XP050111225, pp. 3, [retrieved on Jan. 19, 2006].

\* cited by examiner

US 9,106,389 B2

INTERFERENCE RANDOMIZATION FOR UPLINK SIGNALING

RELATED APPLICATIONS

This application is related to and claims priority from U.S. Provisional Patent Application Ser. No. 61/426,631, filed Dec. 23, 2010, for "PUCCH FORMAT 3 INTERFERENCE RANDOMIZATION," which is incorporated herein by reference in its entirety.

TECHNICAL FIELD

The present disclosure relates generally to wireless communication systems. More specifically, the present disclosure relates to systems and methods for interference randomization for uplink signaling.

BACKGROUND

Wireless communication systems are widely deployed to provide various types of communication content such as voice, video, data and so on. These systems may be multiple-access systems capable of supporting simultaneous communication of multiple terminals with one or more base stations.

As the number of terminals in communication with each base station increases, the chance for interference also increases. Signal processing techniques may be implemented to reduce the chance of interference. One such signal processing technique may be the use of interference randomization. In interference randomization, orthogonal cover codes applied to subcarriers may be adjusted to reduce the chances of interference between each subcarrier. In Long Term Evolution (LTE), multiple positive-acknowledgements/negative-acknowledgements may be sent on an uplink channel to a base station. These multiple positive-acknowledgements/negative-acknowledgements may be sent within one slot to multiplex different users. Cell-specific symbol-level cyclic shift hopping has traditionally been used to reduce interference. However, cell-specific symbol-level cyclic shift hopping alone may not reduce interference to satisfactory levels. Thus, benefits may be realized by improved methods for generating and receiving uplink signaling with reduced interference.

SUMMARY

A method for transmitting an acknowledgement/negative acknowledgement is described. Cell-specific symbol-level cyclic shift hopping is applied to data single-carrier frequency division multiplexing symbols of the acknowledgement/negative acknowledgement. A discrete Fourier transform is applied to the data single-carrier frequency division multiplexing symbols. Cell-specific symbol-level phase hopping is applied to the data single-carrier frequency division multiplexing symbols of the acknowledgement/negative acknowledgement. The data single-carrier frequency division multiplexing symbols are transmitted in a slot.

Applying cell-specific symbol-level phase hopping may include obtaining a cyclic shift hopping sequence, generating a theta sequence with a different initialization of a pseudonoise sequence and applying the theta sequence to each data single-carrier frequency division multiplexing symbol as part of an orthogonal cover code. Applying cell-specific symbol-level phase hopping may instead include obtaining a cyclic shift hopping sequence, generating a theta sequence from the cyclic shift hopping sequence and applying the theta sequence to each data single-carrier frequency division multiplexing symbol as part of an orthogonal cover code.

The cyclic shift hopping sequence may be $n_{cs}^{cell}(n_s,l)$. The theta sequence may be generated as $(n_{cs}^{cell}(n_s,l))^2$, as $n_{cs}^{cell}(n_s,l)\cdot 1$, or as $n_{cs}^{cell}(n_s-\delta_1,l-\delta_2)$ wherein $\delta_1$ and $\delta_2$ are integers. The theta sequence may also be generated as $\lfloor n_{cs}^{cell}(n_s,l)/G \rfloor$, wherein G is an integer. The theta sequence may be generated using a combination of at least two of a square scheme, a linear scheme, a delay scheme and a division scheme of the cyclic shift hopping sequence.

The cell-specific symbol-level phase hopping may be applied to data single-carrier frequency division multiplexing symbols before a discrete Fourier transform. The cell-specific symbol-level phase hopping may also be applied to data single-carrier frequency division multiplexing symbols after a discrete Fourier transform. An effective orthogonal cover code applied to a subcarrier may be $$\left[w(m)e^{j\frac{2\pi \cdot n_{cs}^{cell}(n_s,l)\cdot k}{12}}\right]\times e^{j\frac{2\pi \cdot \theta^{cell}(n_s,l)}{Q}}, m=0,1,2,3,4.$$

Q may be set equal to 2, 4 or 12.

The cell-specific symbol-level phase hopping may be a function of a Cell ID. The cell-specific symbol-level phase hopping may reduce a chance of coherent combining of an interferer's signal. The data single-carrier frequency division multiplexing symbols may be transmitted in a slot using physical uplink control channel Format 3.

A wireless device configured for transmitting an acknowledgement/negative acknowledgement is also described. The wireless device includes a processor, memory in electronic communication with the processor and instructions stored in the memory. The instructions are executable by the processor to apply cell-specific symbol-level cyclic shift hopping to data single-carrier frequency division multiplexing symbols of the acknowledgement/negative acknowledgement. The instructions are also executable by the processor to apply a discrete Fourier transform to the data single-carrier frequency division multiplexing symbols. The instructions are further executable by the processor to apply cell-specific symbol-level phase hopping to the data single-carrier frequency division multiplexing symbols of the acknowledgement/negative acknowledgement. The instructions are also executable by the processor to transmit the data single-carrier frequency division multiplexing symbols in a slot.

A method for receiving an acknowledgement/negative acknowledgement from a user equipment is described. An acknowledgement/negative acknowledgement that is physical uplink control channel Format 3 with cell-specific symbol-level phase hopping is received from the user equipment. A corresponding despreading is applied according to an applied hopping phase for each single-carrier frequency division multiplexing symbol. The acknowledgement/negative acknowledgement is decoded.

A wireless device configured for receiving an acknowledgement/negative acknowledgement is also described. The wireless device includes a processor, memory in electronic communication with the processor and instructions stored in the memory. The instructions are executable by the processor to receive an acknowledgement/negative acknowledgement that is physical uplink control channel Format 3 with cell-specific symbol-level phase hopping from the user equipment. The instructions are also executable by the processor to perform a corresponding despreading according to an applied hopping phase for each single-carrier frequency division multiplexing symbol. The instructions are further executable by the processor to decode the acknowledgement/negative acknowledgement.

A wireless device configured for transmitting an acknowledgement/negative acknowledgement is described. The wireless device includes means for applying cell-specific symbol-level cyclic shift hopping to data single-carrier frequency division multiplexing symbols of the acknowledgement/negative acknowledgement. The wireless device also includes means for applying a discrete Fourier transform to the data single-carrier frequency division multiplexing symbols. The wireless device further includes means for applying cell-specific symbol-level phase hopping to the data single-carrier frequency division multiplexing symbols of the acknowledgement/negative acknowledgement. The wireless device also includes means for transmitting the data single-carrier frequency division multiplexing symbols in a slot.

A computer-program product for transmitting an acknowledgement/negative acknowledgement is also described. The computer-program product includes a non-transitory computer-readable medium having instructions thereon. The instructions include code for causing a user equipment to apply cell-specific symbol-level cyclic shift hopping to data single-carrier frequency division multiplexing symbols of the acknowledgement/negative acknowledgement. The instructions also include code for causing the user equipment to apply a discrete Fourier transform to the data single-carrier frequency division multiplexing symbols. The instructions further include code for causing the user equipment to apply cell-specific symbol-level phase hopping to the data single-carrier frequency division multiplexing symbols of the acknowledgement/negative acknowledgement. The instructions also include code for causing the user equipment to transmit the data single-carrier frequency division multiplexing symbols in a slot.

A wireless device configured for receiving an acknowledgement/negative acknowledgement from a user equipment is described. The wireless device includes means for receiving an acknowledgement/negative acknowledgement that is physical uplink control channel Format 3 with cell-specific symbol-level phase hopping from the user equipment. The wireless device also includes means for performing a corresponding despreading according to an applied hopping phase for each single-carrier frequency division multiplexing symbol. The wireless device further includes means for decoding the acknowledgement/negative acknowledgement.

A computer-program product for receiving an acknowledgement/negative acknowledgement from a user equipment is also described. The computer-program product includes a non-transitory computer-readable medium having instructions thereon. The instructions include code for causing a base station to receive an acknowledgement/negative acknowledgement that is physical uplink control channel Format 3 with cell-specific symbol-level phase hopping from the user equipment. The instructions also include code for causing the base station to perform a corresponding despreading according to an applied hopping phase for each single-carrier frequency division multiplexing symbol. The instructions further include code for causing the base station to decode the acknowledgement/negative acknowledgement.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

Figure 1:
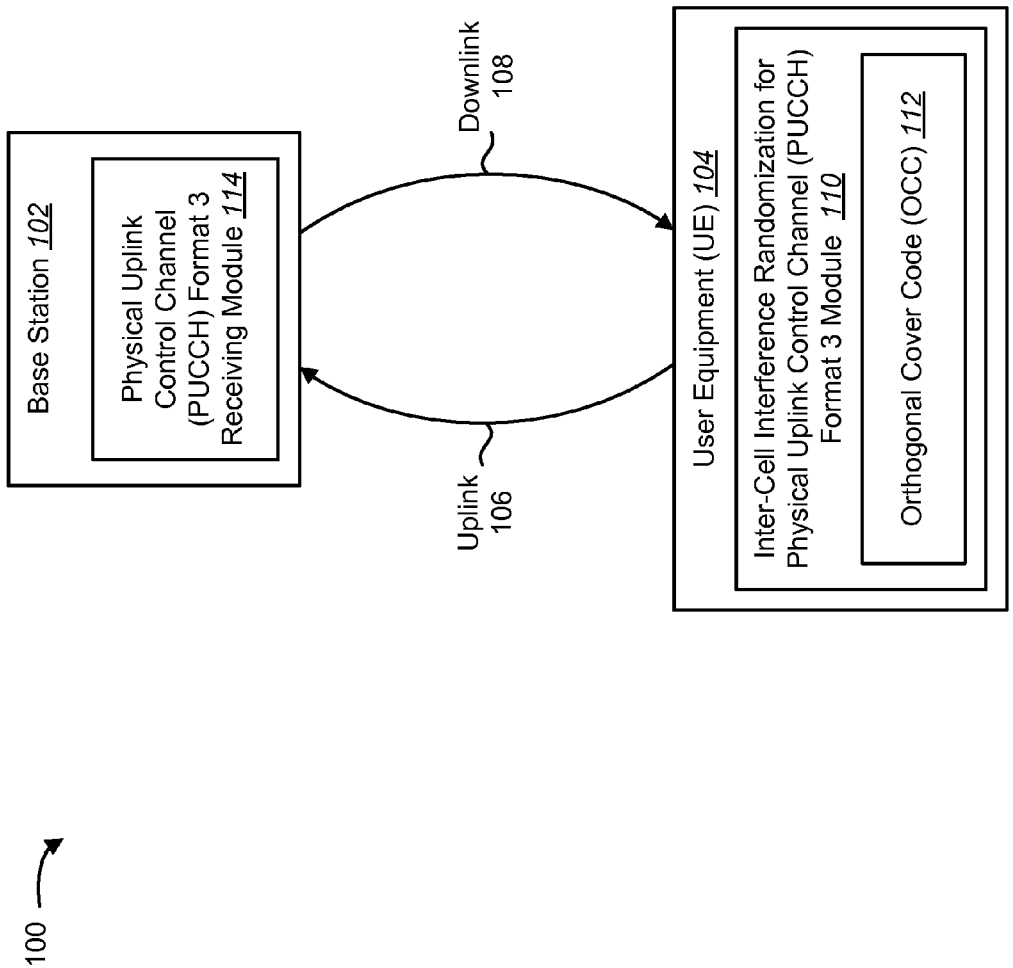
FIG. 1 shows a wireless communication system with multiple wireless devices.

FIG. 1 shows a wireless communication system 100 with multiple wireless devices. Wireless communication systems 100 are widely deployed to provide various types of communication content such as voice, data and so on. A wireless device may be a base station 102 or a user equipment (UE) 104.

A base station 102 is a station that communicates with one or more user equipments (UEs) 104. A base station 102 may also be referred to as, and may include some or all of the functionality of, an access point, a broadcast transmitter, a NodeB, an evolved NodeB, etc. The term "Base Station" will be used herein. Each base station 102 provides communication coverage for a particular geographic area. A base station 102 may provide communication coverage for one or more user equipments (UEs) 104. The term "cell" can refer to a base station 102 and/or its coverage area depending on the context in which the term is used.

Communications in a wireless communication system 100 (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink 106 and downlink 108 transmissions are on the same frequency region so that the reciprocity principle allows the estimation of the downlink 108 channel from the uplink 106 channel. This enables a transmitting wireless device to extract transmit beamforming gain from communications received by the transmitting wireless device.

The wireless communication system 100 may be a multiple-access system capable of supporting communication with multiple user equipments (UEs) 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

A base station 102 may communicate with one or more user equipments (UEs) 104. A user equipment (UE) 104 may also be referred to as, and may include some or all of the functionality of, a terminal, an access terminal, a wireless communication device, a subscriber unit, a station, etc. A user equipment (UE) 104 may be a cellular phone, a personal digital assistant (PDA), a wireless device, a wireless modem, a handheld device, a laptop computer, etc.

A user equipment (UE) 104 may communicate with zero, one or multiple base stations 102 on the downlink 108 and/or uplink 106 at any given moment. The downlink 108 (or forward link) refers to the communication link from a base station 102 to a user equipment (UE) 104, and the uplink 106 (or reverse link) refers to the communication link from a user equipment (UE) 104 to a base station 102.

In LTE Rel-10, physical uplink control channel (PUCCH) Format 3 is introduced for multiple positive-acknowledgement/negative-acknowledgement (ACK/NACK) feedback. Physical uplink control channel (PUCCH) Format 3 relies on different orthogonal cover codes (OCCs) 112 across data (pilot) single-carrier frequency division multiplexing (SC-FDM) symbols within one slot to multiplex different users. In case of a single antenna transmission, one user equipment (UE) 104 needs to occupy one orthogonal cover code (OCC) 112 resource. In physical uplink control channel (PUCCH) Format 3, the user equipment (UE) 104 may transmit a discrete Fourier transform (DFT) spread orthogonal frequency division multiplexing (OFDM) (DFT-S-OFDM) waveform in each single-carrier frequency division multiplexing (SC-FDM) symbol.

Cell-specific symbol-level cyclic shift hopping has been introduced for physical uplink control channel (PUCCH) Format 3 to reduce interference. However, additional interference reduction may be needed. In one configuration, a user equipment (UE) 104 may use cell-specific symbol-level phase hopping in addition to or in place of cell-specific symbol-level cyclic shift hopping. A user equipment (UE) 104 may include an inter-cell interference randomization for physical uplink control channel (PUCCH) Format 3 module 110. The inter-cell interference randomization for physical uplink control channel (PUCCH) Format 3 module 110 may implement cell-specific symbol-level phase hopping for a user equipment (UE) 104. The inter-cell interference randomization for physical uplink control channel (PUCCH) Format 3 module 110 may adjust the orthogonal cover code (OCC) 112 applied to each subcarrier to implement cell-specific symbol-level phase hopping.

A base station 102 may include a physical uplink control channel (PUCCH) Format 3 receiving module 114. The physical uplink control channel (PUCCH) Format 3 receiving module 114 may be used by the base station 102 to receive a physical uplink control channel (PUCCH) Format 3 ACK/NACK from a user equipment (UE) 104.

Figure 2:
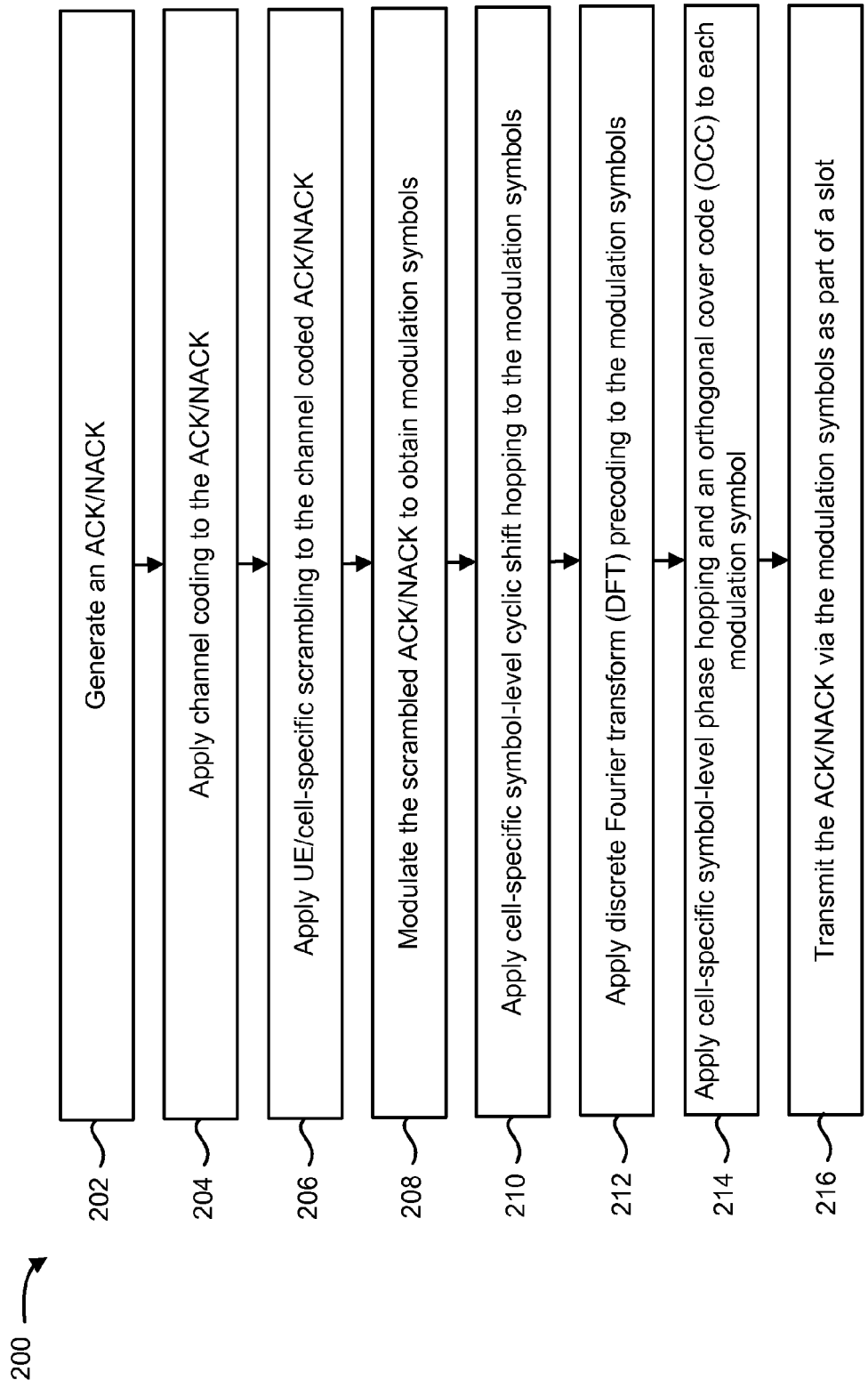
FIG. 2 is a flow diagram of a method for transmitting an ACK/NACK.

FIG. 2 is a flow diagram of a method 200 for transmitting an ACK/NACK. The method 200 may be performed by a user equipment (UE) 104. The user equipment (UE) 104 may generate 202 an ACK/NACK. The ACK/NACK may be generated 202 in response to downlink 108 communications received from a base station 102. The user equipment (UE) 104 may apply 204 channel coding to the ACK/NACK. The user equipment (UE) 104 may then apply 206 UE/cell-specific scrambling to the channel coded ACK/NACK.

The user equipment (UE) 104 may modulate 208 the scrambled ACK/NACK to obtain modulation symbols. As used herein, modulation symbol refers to quadrature phase shift keying (QPSK), 16 quadrature amplitude modulation (QAM), 64 quadrature amplitude modulation (QAM), etc. complex numbers. In contrast, an SC-FDM symbol may refer to the outcome of single-carrier waveform generation. An SC-FDM symbol is an OFDM waveform that includes the waveform within a particular time duration, which is called a symbol duration. The user equipment (UE) 104 may then apply 210 cell-specific symbol-level cyclic shift hopping to the modulation symbols. Cell-specific symbol-level cyclic shift hopping is performed in the time domain and is discussed in additional detail below in relation to FIG. 6. The cell-specific symbol-level cyclic shift hopping may apply a cyclic shift in the time domain to make the modulation symbols appear randomly and independently distributed.

The user equipment (UE) 104 may then apply 212 a discrete Fourier transform (DFT) preceding to the modulation symbols. The discrete Fourier transform (DFT) may transform the modulation symbols to the frequency domain. The user equipment (UE) 104 may apply 214 cell-specific symbol-level phase hopping and an orthogonal cover code (OCC) 112 to each modulation symbol. The cell-specific symbol-level phase hopping may adjust the effective orthogonal cover code (OCC) applied to each SC-FDM symbol. The user equipment (UE) 104 may then transmit 216 the ACK/NACK via the modulation symbols as part of a slot.

Figure 3:
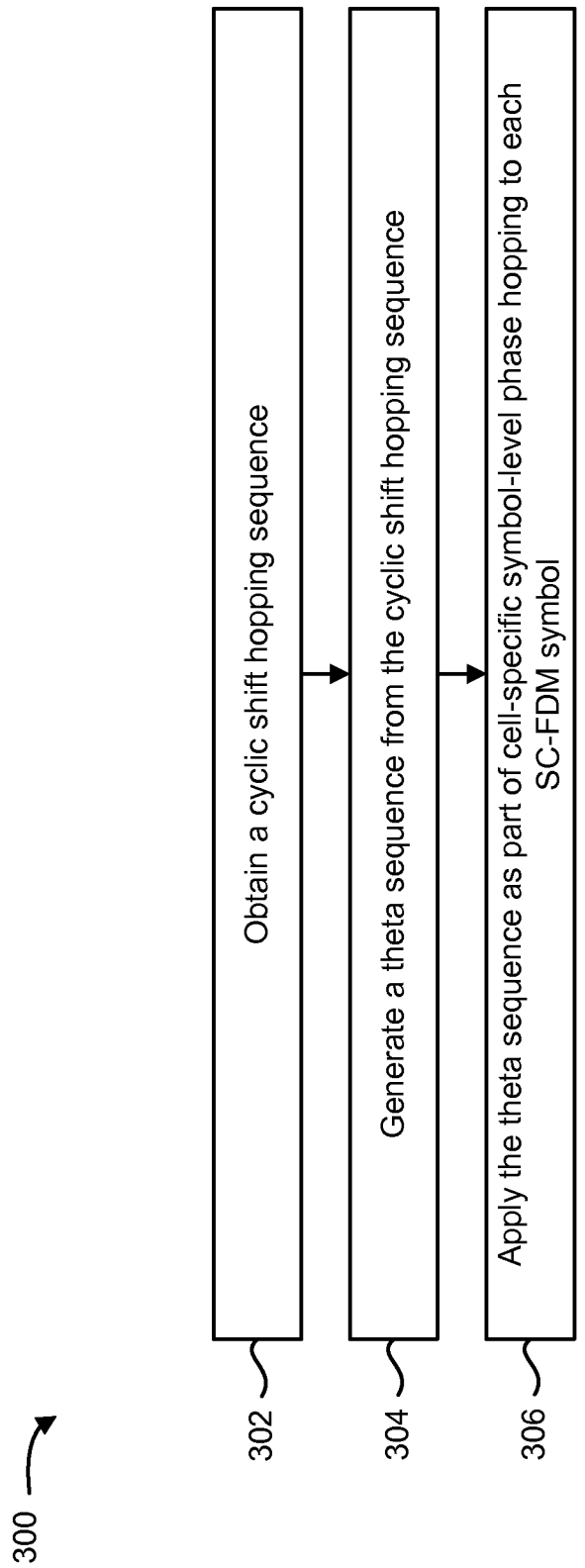
FIG. 3 is a flow diagram of a method for applying cell-specific symbol-level phase hopping.

FIG. 3 is a flow diagram of a method 300 for applying cell-specific symbol-level phase hopping. The method 300 may be performed by a user equipment (UE) 104. The user equipment (UE) 104 may obtain 302 a cyclic shift hopping sequence. The user equipment (UE) 104 may then generate 304 a theta sequence for the cell-specific symbol-level phase hopping. A generated theta sequence may be part of an effective orthogonal cover code (OCC) applied to each SC-FDM symbol. The user equipment (UE) 104 may then apply 306 the theta sequence as part of cell-specific symbol-level phase hopping to each SC-FDM symbol. The theta sequence is discussed in additional detail below in relation to FIG. 8.

In one configuration, the theta sequence may be generated similarly to the cyclic shift hopping sequence but with a different initialization. For example, the initialization $c_{init}$=floor{CellID/30} may be used for the theta sequence. The floor function refers to the mapping of a real number to the largest previous integer. The theta sequence may thus be generated with a different initialization of the pseudonoise (PN) sequence from the cyclic shift hopping sequence.

In another configuration, the theta sequence may be generated from the cyclic shift hopping sequence. Multiple different schemes may be utilized to render decoupled cyclic shift hopping and phase hopping. In a square scheme, the theta sequence may be generated using $\theta(n_s,l)=(n_{cs}^{cell}(n_s,l))^2$. In a linear scheme, the theta sequence may be generated using $\theta(n_s,l)=(n_{cs}^{cell}(n_s,l))^2 \cdot l$. In a delay scheme, the theta sequence may be generated using $\theta(n_s,l)=(n_{cs}^{cell}(n_s-\delta_1,l-\delta_2))$, where $\delta_1$ and $\delta_2$ are integers. In a division scheme, the theta sequence may be generated using $\theta(n_s,l)=\lfloor n_{cs}^{cell}(n_s,l)/G \rfloor$, where G is an integer. In one configuration, G may be 12. A combination of the above options may also be used to generate the theta sequence. For example, $\theta(n_s,l)=\lfloor n_{cs}^{cell}(n_s,l)/G \rfloor + n_{cs}^{cell}(n_s,l) \cdot l$ may be used to generate the theta sequence.

Figure 4:
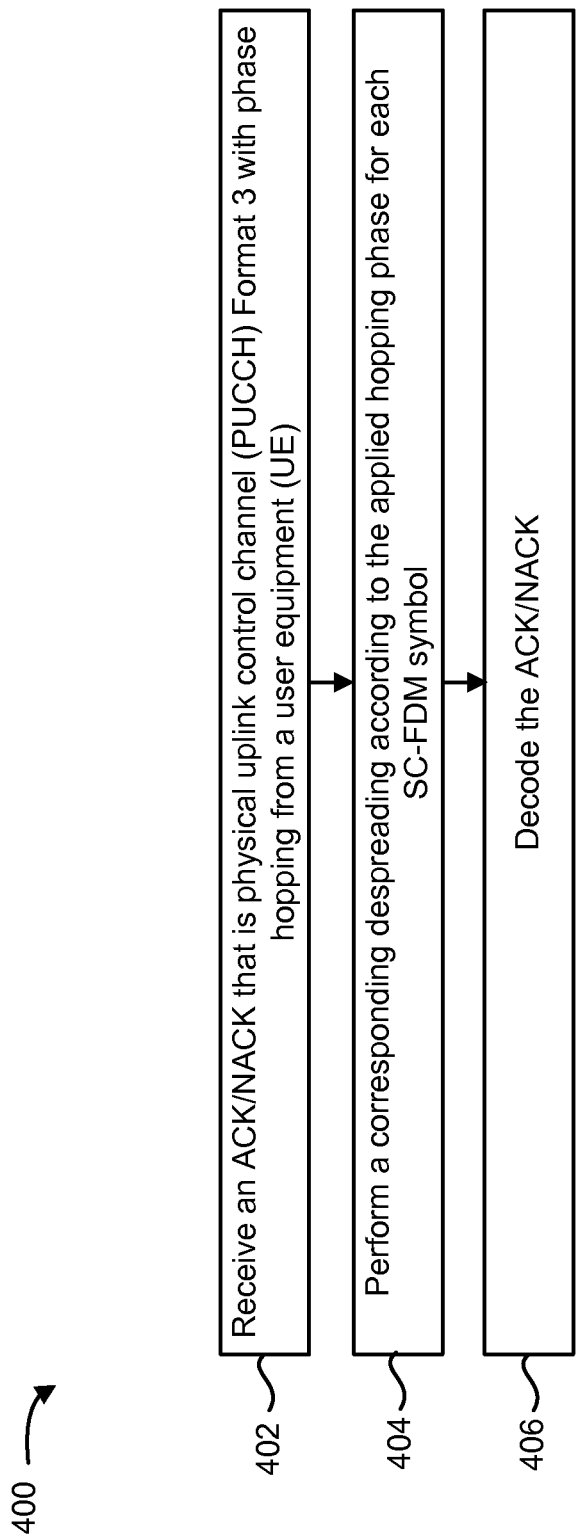
FIG. 4 is a flow diagram of a method for decoding an ACK/NACK.

FIG. 4 is a flow diagram of a method 400 for decoding an ACK/NACK. The method 400 may be performed by a base station 102. In one configuration, the base station 102 may be an eNode B. The base station 102 may receive 402 an ACK/NACK that was transmitted using physical uplink control channel (PUCCH) Format 3 with cell-specific symbol-level phase hopping from a user equipment (UE) 104. The base station 102 may perform 404 a corresponding despreading according to the applied phase hopping for each SC-FDM symbol. The symbol-level phase hopping at the user equipment (UE) 104 may be cell-specific. For example, the cyclic shift hopping sequence n_cs(n_s,l) may be initialized with the serving cell ID. The base station 102 knows the spreading sequence and will perform the corresponding operations. The base station 102 may then decode 406 the ACK/NACK.

Figure 5:
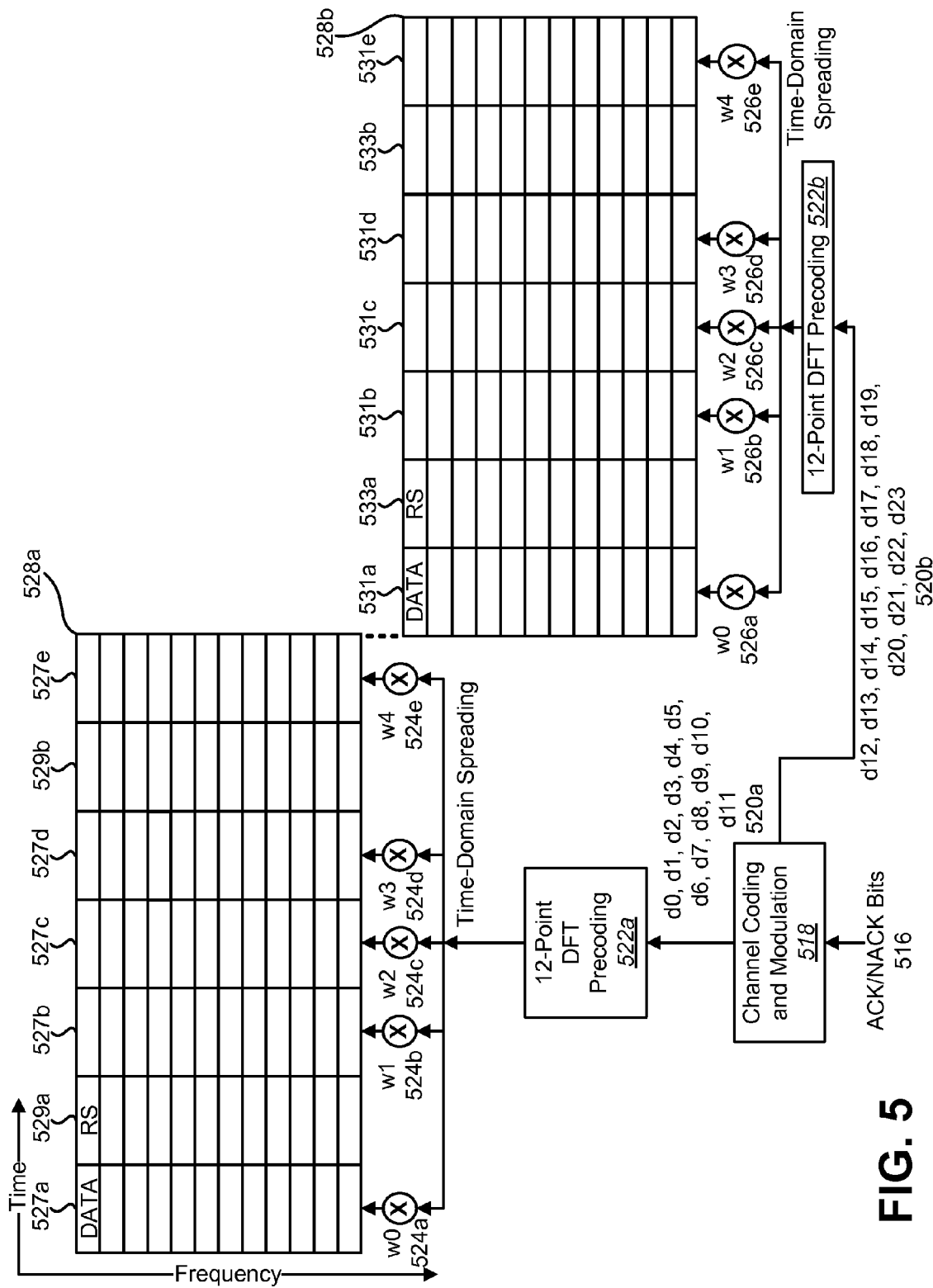
FIG. 5 is a block diagram illustrating the physical uplink control channel (PUCCH) Format 3 in two slots.

FIG. 5 is a block diagram illustrating the physical uplink control channel (PUCCH) Format 3 in two slots 528a-b. Each slot 528 may include seven SC-FDM symbols 527a-e, 529a-b, 531a-e, 533a-b separated in time for normal cyclic prefix configuration. Each SC-FDM symbol 527, 529, 531, 533 may include twelve tones separated in frequency. In the first slot 528a, two SC-FDM symbols 529a-b may include reference signals used for decoding purposes while the other five SC-FDM symbols 527a-e include data. Likewise, in the second slot 528b, two SC-FDM symbols 533a-b may include reference signals used for decoding purposes while the other five SC-FDM symbols 531a-e include data.

ACK/NACK bits 516 may be passed through a channel coding and modulation block 518 to obtain twelve modulation symbols d0-d11 520a for the first slot 528a and twelve modulation symbols d12-d23 520b for the second slot 528b. The first slot 528a and the second slot 528b may be separated in both frequency and in time. The twelve modulation symbols d0-d11 520a for the first slot 528a may be passed through a 12-point discrete Fourier transform (DFT) precoding block 522a and then spread in the time-domain of the first slot 528a using orthogonal cover codes (OCCs) w0 524a, w1 524b, w2 524c, w3 524d and w4 524e. The twelve modulation symbols d12-d23 520b for the second slot 528b may be passed through a 12-point discrete Fourier transform (DFT) precoding block 522b and then spread in the time-domain of the second slot 528b using orthogonal cover codes (OCCs) w0 526a, w1 526b, w2 526c, w3 526d and w4 526e.

Effectively, a different orthogonal cover code (OCC) 112 is applied to each subcarrier. The effective orthogonal cover code (OCC) 112 applied to each subcarrier in the frequency domain may include cell-specific symbol-level cyclic shift hopping and cell-specific symbol-level phase hopping.

Figure 6:
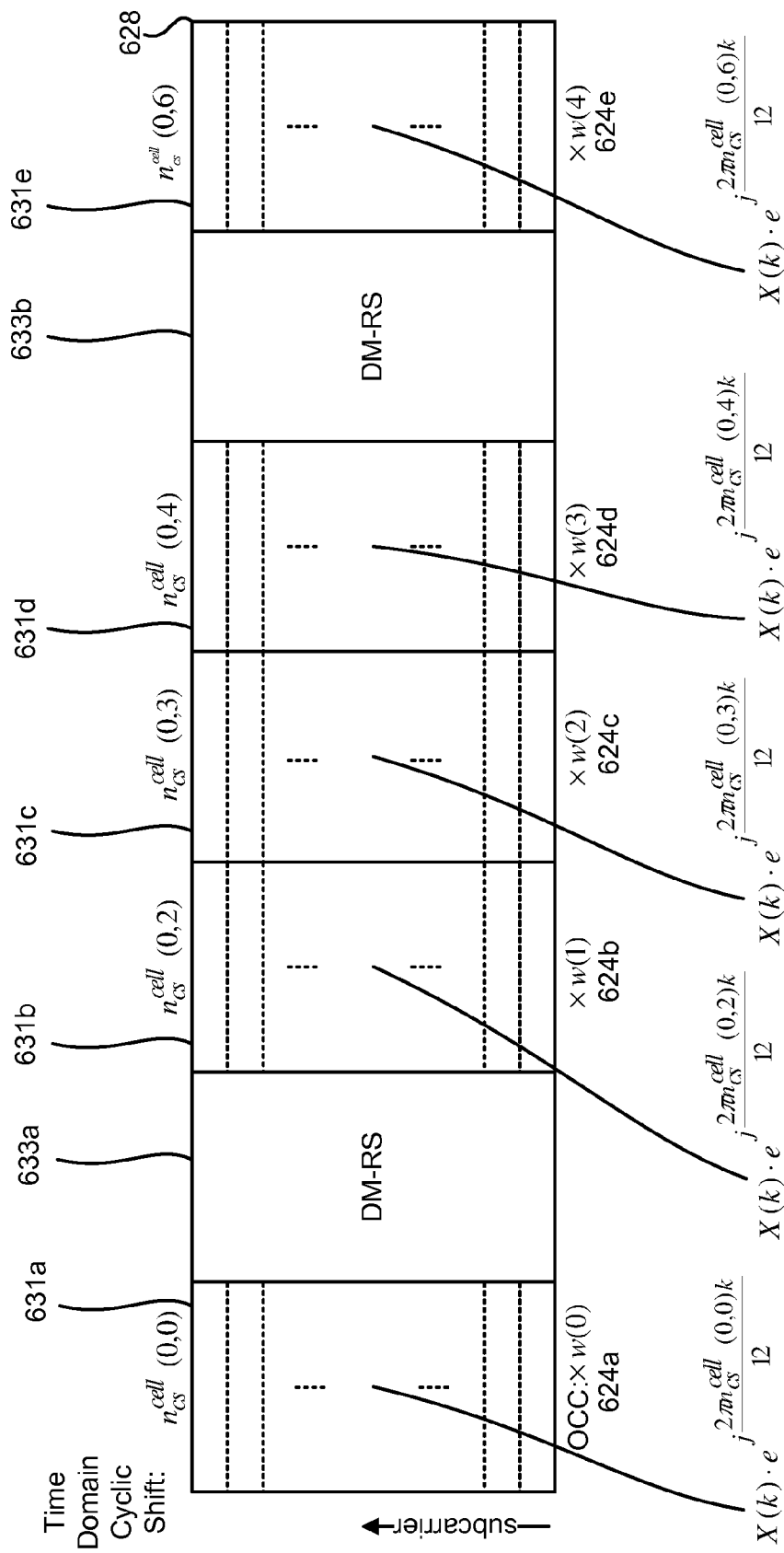
FIG. 6 is a block diagram illustrating a slot with cell-specific symbol-level cyclic shift hopping.

FIG. 6 is a block diagram illustrating a slot 628 with cell-specific symbol-level cyclic shift hopping. The slot 628 is shown in the frequency domain (i.e., after a 12-point discrete Fourier transform (DFT) has been performed). The slot 628 may include seven SC-FDM symbols 631a-e, 633a-b. Two of the SC-FDM symbols 633a-b may be designated for reference signals (DM-RS) and the other five SC-FDM symbols 631a-e may be designated for data. The cell-specific symbol-level cyclic shift hopping may be applied to the SC-FDM symbols 631a-e designated for data.

The modulation symbols d0-d11 520a may be represented as x[n]. Equation (1) may be derived:

$$X(k)=12\text{Point DFT}\{x[n]\}. \quad (1)$$

Effectively, a different orthogonal cover code (OCC) 624a-e is applied to each of the subcarriers. The orthogonal cover code (OCC) 624a-e applied to subcarrier k is that of Equation (2):

$$w(m)e^{j\frac{2\pi \cdot n_{cs}^{cell}(n_s,l) \cdot k}{12}}, m=0,1,2,3,4. \quad (2)$$

In Equation (2), l is the OFDM symbol index, $n_s$ is the slot index, m is the data symbol index and $n_{cs}$ is the cyclic shift. For each data symbol, w(m) is the assigned orthogonal cover code (OCC) 112.

In RAN1#62, it was agreed that UE/cell-specific scrambling (after channel coding and before modulation) is supported. The UE/cell-specific scrambling may be a function of the physical cell ID (PCI) and the radio network temporary identifier (RNTI). For Rel-8, cell-specific symbol-level cyclic shift hopping (before the discrete Fourier transform (DFT)) is also supported. The pseudo-random cyclic shift hopping sequence used in the present systems and methods may be identical to that used in Rel-8 and be a function of the cell ID. The cyclic shift in slot $n_s$, symbol/is found using Equation (3):

$$n_{cs}^{cell}(n_s,l)=\Sigma_{i=0}^{7} c(8N_{symb}^{UL} \cdot n_s + 8l + i) \cdot 2^i \quad (3)$$

The pseudo-random sequence c(i) may be initialized using $c_{init}$=CellID. The cyclic shift may be a function of the physical cell ID (PCI). In RAN1#63, orthogonal cover code (OCC) 112 remapping across slots was agreed upon to further randomize intra-cell interference. It is a working assumption that Rel-8 remapping be adapted to the Format 3 subframe. In Rel-8, orthogonal cover code (OCC) 112 remapping is deterministic. Thus, orthogonal cover code (OCC) 112 remapping is the same in different cells for the same resource index.

Figure 7:
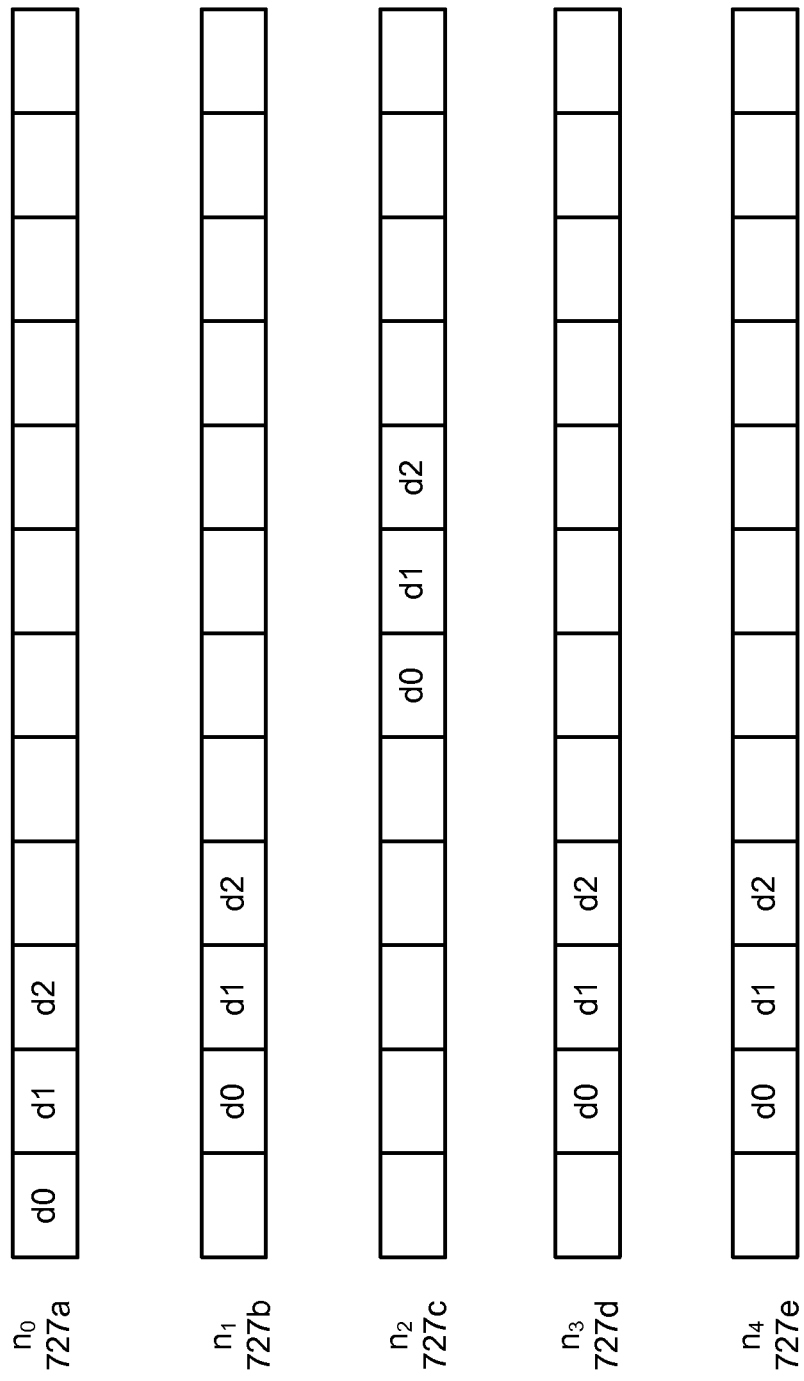
FIG. 7 is a block diagram illustrating symbol-level cyclic shift hopping.

FIG. 7 is a block diagram illustrating symbol-level cyclic shift hopping in the time domain. For each of the five data symbols $n_0$ 727a, $n_1$ 727b, $n_2$ 727c, $n_3$ 727d, $n_4$ 727e, a random and independent cyclic shift in the time domain has been applied. When an interfering user equipment (UE) 104 uses the same orthogonal cover code (OCC) 112 as the served user equipment (UE) 104, the chance of coherently combining the interferer's signal is high. The probability that three or more cyclic shifts are the same is 6.11%. The probability that four or more cyclic shifts are the same is 0.27%. These probabilities may be too high (i.e., they may result in interference that is above acceptable limits). Therefore, cell-specific symbol-level phase hopping is needed to reduce the chance of coherent combining of interference. Simulation results show a 0.1% bit error rate (BER) could be achieved with symbol-level phase hopping when the received interference is of the same power as the serving cell's signal at the user equipment (UE) 104.

Figure 8:
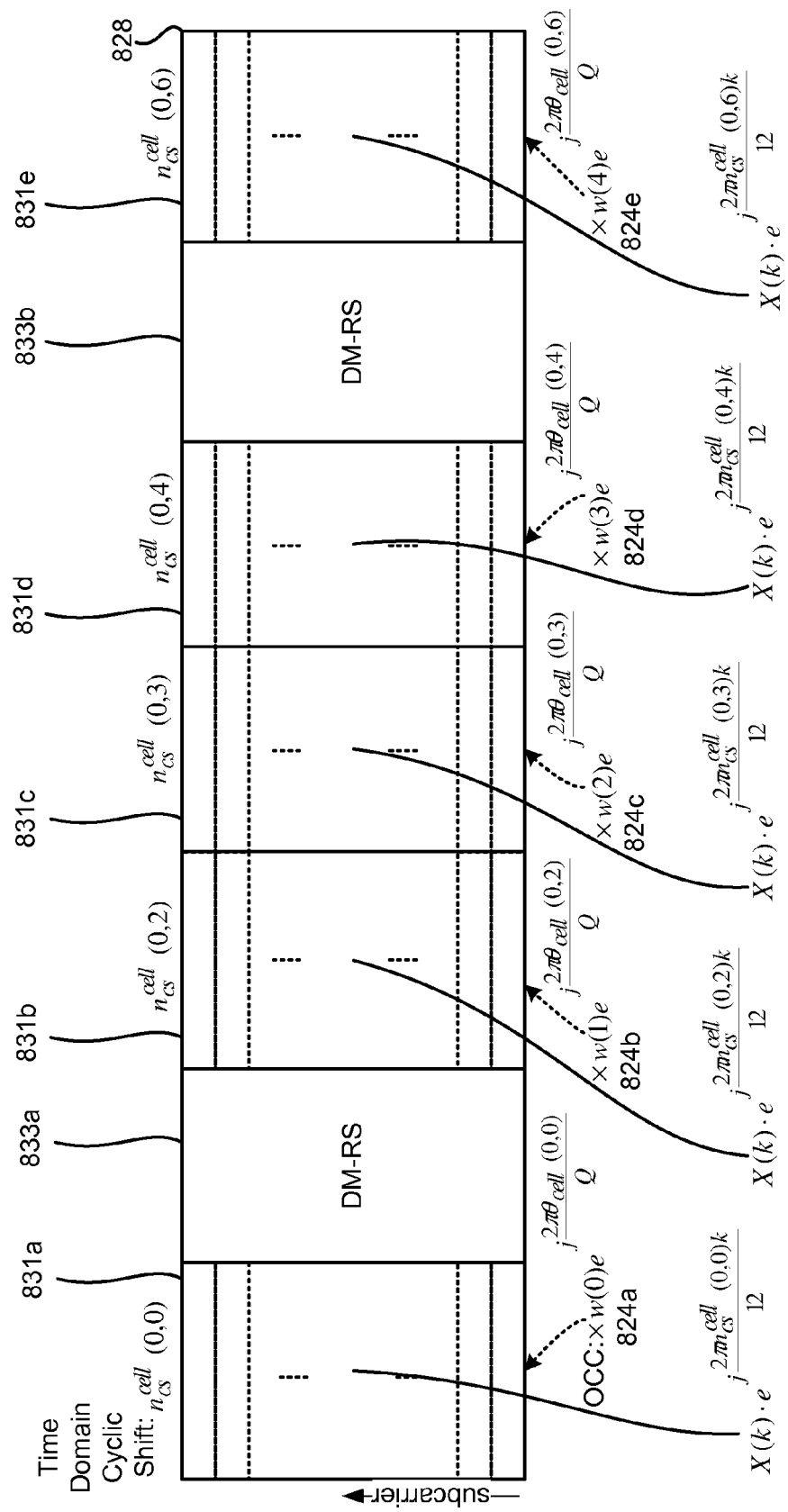
FIG. 8 is a block diagram illustrating a slot with cell-specific symbol-level phase hopping.

FIG. 8 is a block diagram illustrating a slot 828 with cell-specific symbol-level phase hopping. Introducing additional cell-specific symbol-level phase hopping to a slot 828 with cell-specific symbol-level cyclic shift hopping may decrease the chance of coherent combining of an interfering signal, especially when the interfering user equipment (UE) 104 is assigned the same orthogonal cover code (OCC) 112. The cell-specific symbol-level phase hopping may reduce the chance of coherent combining of the interferer's signal. Each slot 828 may include five SC-FDM symbols 831a-e that include data and two SC-FDM symbols 833a-b that are designated for reference symbols (DM-RS).

The orthogonal cover code (OCC) 824a-e applied to each data SC-FDM symbol 831a-e may be adjusted by $$e^{j\frac{2\pi \cdot \theta^{cell}(n_s, l)}{Q}},$$

where $\theta^{cell}$ is the generated theta sequence and Q is the number of phases. For 12-phase shift keying (PSK) phase hopping, Q=12. For quadrature phase shift keying (QPSK) phase hopping, Q=4. For binary phase shift keying (BPSK) phase hopping, Q=2 (which is really simple to implement). The effective orthogonal cover code (OCC) 824 applied to subcarrier k in a slot 828 is thus given in Equation (4):

$$\left[ w(m) e^{j\frac{2\pi \cdot n_{cs}^{cell}(n_s, l) \cdot k}{12}} \right] \times e^{j\frac{2\pi \cdot \theta^{cell}(n_s, l)}{Q}}, m = 0, 1, 2, 3, 4. \quad (4)$$

The cell-specific symbol-level phase hopping is a function of the Cell ID. The cell-specific symbol-level phase hopping may reduce the chance of coherent combining of the interferer's signal. Binary phase shift keying (BPSK) phase hopping or {+1, −1} binary random sign flipping may be enough. In case of a strong neighbor's interference, joint detection of a signal of interest and an interferer's signal including interference cancellation (possibly with multiple iterations) can be implemented for further performance enhancements.

Figure 9:
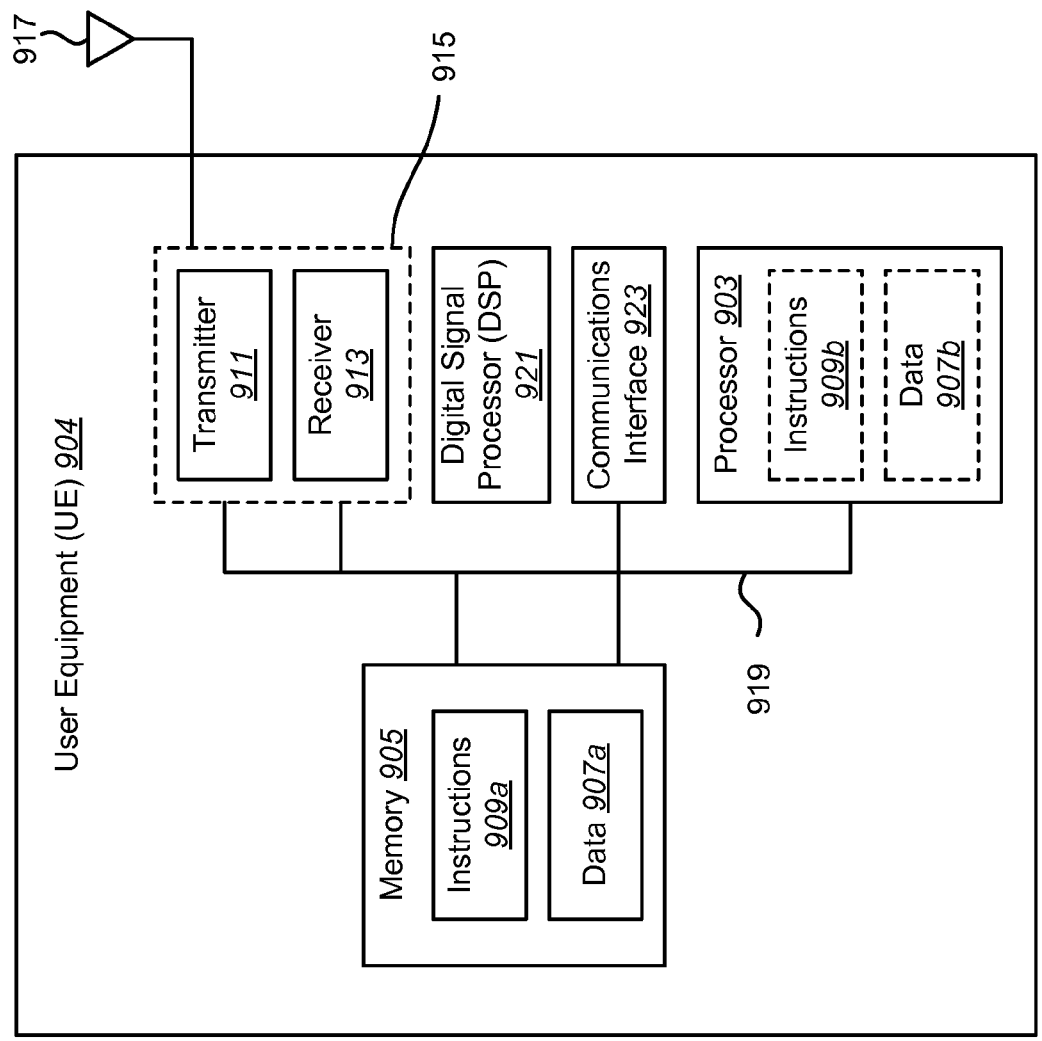
FIG. 9 illustrates certain components that may be included within a user equipment (UE)

FIG. 9 illustrates certain components that may be included within a user equipment (UE) 904. The user equipment (UE) 904 may be an access terminal, a mobile station, a wireless communication device, etc. The user equipment (UE) 904 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the user equipment (UE) 904 of FIG. 9, in an alternative configuration, a combination of processors (e.g., an ARM and DSP) could be used.

The user equipment (UE) 904 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909a, various portions of the instructions 909b may be loaded onto the processor 903, and various pieces of data 907b may be loaded onto the processor 903.

The user equipment (UE) 904 may also include a transmitter 911 and a receiver 913 to allow transmission and reception of signals to and from the user equipment (UE) 904. The transmitter 911 and receiver 913 may be collectively referred to as a transceiver 915. An antenna 917 may be electrically coupled to the transceiver 915. The user equipment (UE) 904 may also include (not shown) multiple transmitters, multiple receivers, multiple transceivers and/or additional antennas.

The user equipment (UE) 904 may include a digital signal processor (DSP) 921. The user equipment (UE) 904 may also include a communications interface 923. The communications interface 923 may allow a user to interact with the user equipment (UE) 904.

The various components of the user equipment (UE) 904 may be coupled together by one or more buses, which may include a power bus, a control signal bus, a status signal bus, a data bus, etc. For the sake of clarity, the various buses are illustrated in FIG. 9 as a bus system 919.

Figure 10:
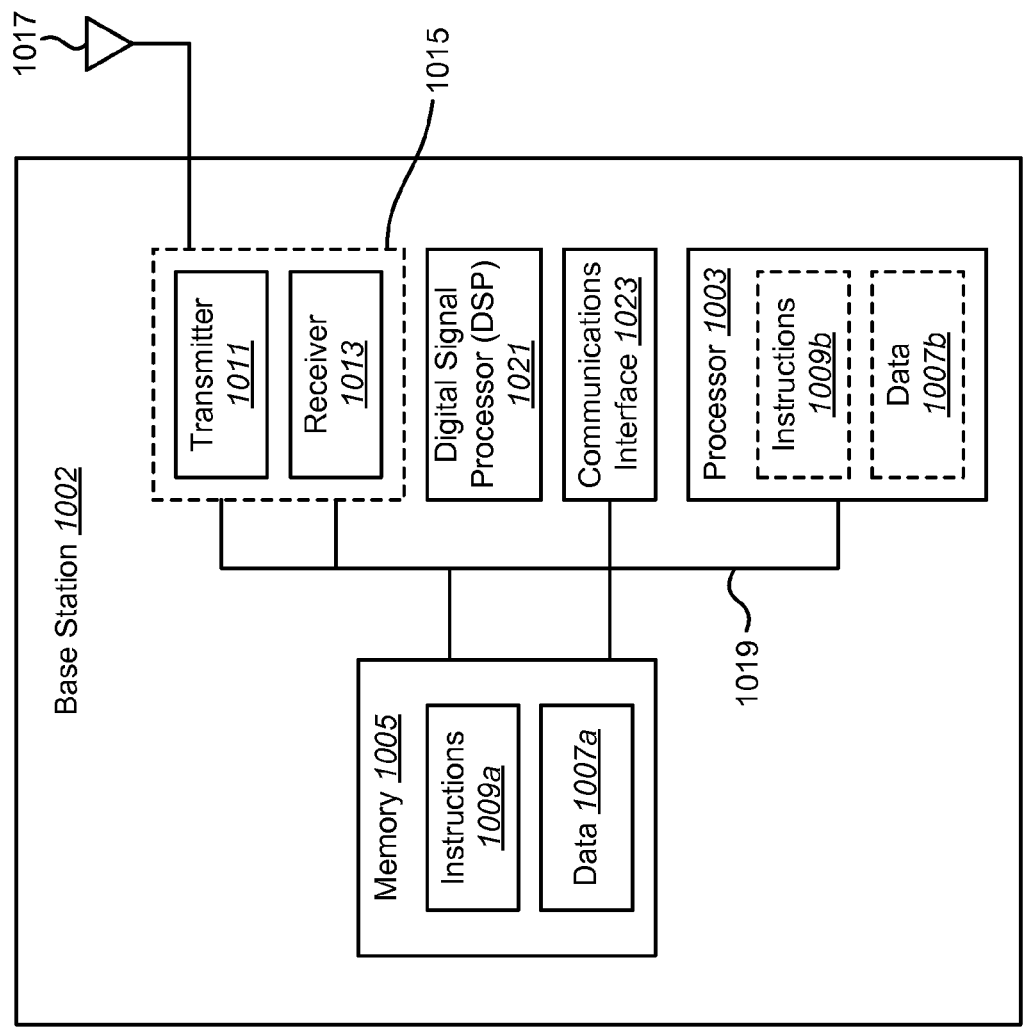
FIG. 10 illustrates certain components that may be included within a base station.

FIG. 10 illustrates certain components that may be included within a base station 1002. A base station 1002 may also be referred to as, and may include some or all of the functionality of, an access point, a broadcast transmitter, a NodeB, an evolved NodeB, etc. The base station 1002 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the base station 1002 of FIG. 10, in an alternative configuration, a combination of processors (e.g., an ARM and DSP) could be used.

The base station 1002 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007a and instructions 1009a may be stored in the memory 1005. The instructions 1009a may be executable by the processor 1003 to implement the methods disclosed herein. Executing the instructions 1009a may involve the use of the data 1007a that is stored in the memory 1005. When the processor 1003 executes the instructions 1009a, various portions of the instructions 1009b may be loaded onto the processor 1003, and various pieces of data 1007b may be loaded onto the processor 1003.

The base station 1002 may also include a transmitter 1011 and a receiver 1013 to allow transmission and reception of signals to and from the base station 1002. The transmitter 1011 and receiver 1013 may be collectively referred to as a transceiver 1015. An antenna 1017 may be electrically coupled to the transceiver 1015. The base station 1002 may also include (not shown) multiple transmitters, multiple receivers, multiple transceivers and/or additional antennas.

The base station 1002 may include a digital signal processor (DSP) 1021. The base station 1002 may also include a communications interface 1023. The communications interface 1023 may allow a user to interact with the base station 1002.

The various components of the base station 1002 may be coupled together by one or more buses, which may include a power bus, a control signal bus, a status signal bus, a data bus, etc. For the sake of clarity, the various buses are illustrated in FIG. 10 as a bus system 1019.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 3 and 4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:
1. A method for transmitting an acknowledgement/negative acknowledgement, comprising:
    generating a cell-specific cyclic shift;
    applying cell-specific symbol-level phase hopping to single-carrier frequency division multiplexing data symbols of the acknowledgement/negative acknowl- edgement, wherein the cell-specific symbol-level phase hopping is based at least in part on the cell-specific cyclic shift;
applying cell-specific symbol-level cyclic shift hopping to the single-carrier frequency division multiplexing data symbols of the acknowledgement/negative acknowledgement, wherein the cell-specific symbol-level cyclic shift hopping is based at least in part on the cell-specific cyclic shift;
applying a discrete Fourier transform to the single-carrier frequency division multiplexing data symbols; and
transmitting the single-carrier frequency division multiplexing data symbols in a slot.

2. The method of claim 1, wherein the cell-specific symbol-level phase hopping is applied to single-carrier frequency division multiplexing data symbols before a discrete Fourier transform.

3. The method of claim 1, wherein the cell-specific symbol-level phase hopping is applied to single-carrier frequency division multiplexing data symbols after a discrete Fourier transform.

4. The method of claim 1, wherein an effective orthogonal cover code applied to a subcarrier is $$\left[w(m)e^{j\frac{2\pi \cdot n_{cs}^{cell}(n_s,l)\cdot k}{12}}\right] \times e^{j\frac{2\pi \cdot \theta^{cell}(n_s,l)}{Q}}, m = 0, 1, 2, 3, 4.$$

5. The method of claim 4, wherein Q is an integer.

6. The method of claim 1, wherein the cell-specific symbol-level phase hopping is a function of a Cell ID, and wherein the cell-specific symbol-level phase hopping reduces a chance of coherent combining of an interferer's signal.

7. The method of claim 1, wherein the single-carrier frequency division multiplexing data symbols are transmitted in a slot using physical uplink control channel Format 3.

8. The method of claim 1, wherein the cell-specific cyclic shift is generated at least based on a symbol index l or a slot index $n_s$, which is given by $n_{cs}^{cell}(n_s,l)$.

9. The method of claim 8, wherein the cell-specific symbol-level phase hopping is generated based on $\lfloor n_{cs}^{cell}(n_s,l)/G \rfloor$, where G is an integer.

10. The method of claim 8, wherein the cell-specific symbol-level cyclic-shift hopping is given by $n_{cs}^{cell}(n_s,l)$.

11. The method of claim 1, further comprising:
generating a theta sequence for the cell-specific symbol-level phase hopping; and
applying the theta sequence to each single-carrier frequency division multiplexing data symbol as part of an orthogonal cover code.

12. A wireless device configured for transmitting an acknowledgement/negative acknowledgement, comprising:
a processor;
memory in electronic communication with the processor;
instructions stored in the memory, the instructions being executable by the processor to:
generate a cell-specific cyclic shift;
apply cell-specific symbol-level phase hopping to single-carrier frequency division multiplexing data symbols of the acknowledgement/negative acknowledgement, wherein the cell-specific symbol-level phase hopping is based at least in part on the cell-specific cyclic shift;
apply cell-specific symbol-level cyclic shift hopping to the single-carrier frequency division multiplexing data symbols of the acknowledgement/negative acknowledgement, wherein the cell-specific symbol-level cyclic shift hopping is based at least in part on the cell-specific cyclic shift;
apply a discrete Fourier transform to the single-carrier frequency division multiplexing data symbols; and
transmit the single-carrier frequency division multiplexing data symbols in a slot.

13. The wireless device of claim 12, wherein the cell-specific symbol-level phase hopping is applied to single-carrier frequency division multiplexing data symbols before a discrete Fourier transform.

14. The wireless device of claim 12, wherein the cell-specific symbol-level phase hopping is applied to single-carrier frequency division multiplexing data symbols after a discrete Fourier transform.

15. The wireless device of claim 12, wherein an effective orthogonal cover code applied to a subcarrier is $$\left[w(m)e^{j\frac{2\pi \cdot n_{cs}^{cell}(n_s,l)\cdot k}{12}}\right] \times e^{j\frac{2\pi \cdot \theta^{cell}(n_s,l)}{Q}}, m = 0, 1, 2, 3, 4.$$

16. The wireless device of claim 15, wherein Q is an integer.

17. The wireless device of claim 12, wherein the cell-specific symbol-level phase hopping is a function of a Cell ID, and wherein the cell-specific symbol-level phase hopping reduces a chance of coherent combining of an interferer's signal.

18. The wireless device of claim 12, wherein the single-carrier frequency division multiplexing data symbols are transmitted in a slot using physical uplink control channel Format 3.

19. A method for receiving an acknowledgement/negative acknowledgement from a user equipment, the method comprising:
receiving an acknowledgement/negative acknowledgement that is physical uplink control channel Format 3 with cell-specific symbol-level phase hopping from the user equipment, wherein the cell-specific symbol-level phase hopping is based at least in part on a cell-specific cyclic shift generated by the user equipment;
performing a corresponding despreading according to an applied hopping phase for each single-carrier frequency division multiplexing symbol; and
decoding the acknowledgement/negative acknowledgement.

20. The method of claim 19, wherein the method is performed by a base station.

21. The method of claim 20, wherein an effective orthogonal cover code applied to a subcarrier is $$\left[w(m)e^{j\frac{2\pi \cdot n_{cs}^{cell}(n_s,l)\cdot k}{12}}\right] \times e^{j\frac{2\pi \cdot \theta^{cell}(n_s,l)}{Q}}, m = 0, 1, 2, 3, 4.$$

22. A wireless device configured for receiving an acknowledgement/negative acknowledgement, comprising:
a processor;
memory in electronic communication with the processor;
instructions stored in the memory, the instructions being executable by the processor to:
receive an acknowledgement/negative acknowledgement that is physical uplink control channel Format 3 with cell-specific symbol-level phase hopping from a user equipment, wherein the cell-specific symbol-level phase hopping is based at least in part on a cell-specific cyclic shift generated by the user equipment;

perform a corresponding despreading according to an applied hopping phase for each single-carrier frequency division multiplexing symbol; and decode the acknowledgement/negative acknowledgement.

23. The wireless device of claim 22, wherein the wireless device is a base station.

24. The wireless device of claim 22, wherein an effective orthogonal cover code applied to a subcarrier is $$\left[w(m)e^{j\frac{2\pi \cdot n_{cs}^{cell}(n_s,l)\cdot k}{12}}\right] \times e^{j\frac{2\pi \cdot \theta^{cell}(n_s,l)}{Q}}, m = 0, 1, 2, 3, 4.$$

25. A wireless device configured for transmitting an acknowledgement/negative acknowledgement, comprising:
   means for generating a cell-specific cyclic shift;
   means for applying cell-specific symbol-level phase hopping to single-carrier frequency division multiplexing data symbols of the acknowledgement/negative acknowledgement, wherein the cell-specific symbol-level phase hopping is based at least in part on the cell-specific cyclic shift;
   means for applying cell-specific symbol-level cyclic shift hopping to the single-carrier frequency division multiplexing symbols of the acknowledgement/negative acknowledgement, wherein the cell-specific symbol-level cyclic shift hopping is based at least in part on the cell-specific cyclic shift;
   means for applying a discrete Fourier transform to the single-carrier frequency division multiplexing data symbols; and
   means for transmitting the single-carrier frequency division multiplexing data symbols in a slot.

26. A computer-program product for transmitting an acknowledgement/negative acknowledgement, the computer-program product comprising a non-transitory computer-readable medium having instructions thereon, the instructions comprising:
   code for causing a user equipment to generate a cell-specific cyclic shift;
   code for causing a user equipment to apply cell-specific symbol-level phase hopping to single-carrier frequency division multiplexing data symbols of the acknowledgement/negative acknowledgement, wherein the cell-specific symbol-level phase hopping is based at least in part on the cell-specific cyclic shift;
   code for causing a user equipment to apply cell-specific symbol-level cyclic shift hopping to the single-carrier frequency division multiplexing data symbols of the acknowledgement/negative acknowledgement, wherein the cell-specific symbol-level cyclic shift hopping is based at least in part on the cell-specific cyclic shift;
   code for causing the user equipment to apply a discrete Fourier transform to the single-carrier frequency division multiplexing data symbols; and
   code for causing the user equipment to transmit the single-carrier frequency division multiplexing data symbols in a slot.

27. A wireless device configured for receiving an acknowledgement/negative acknowledgement from a user equipment, comprising:
   means for receiving an acknowledgement/negative acknowledgement that is physical uplink control channel Format 3 with cell-specific symbol-level phase hopping from the user equipment, wherein the cell-specific symbol-level phase hopping is based at least in part on a cell-specific cyclic shift generated by the user equipment;
   means for performing a corresponding despreading according to an applied hopping phase for each single-carrier frequency division multiplexing symbol; and
   means for decoding the acknowledgement/negative acknowledgement.

28. A computer-program product for receiving an acknowledgement/negative acknowledgement from a user equipment, the computer-program product comprising a non-transitory computer-readable medium having instructions thereon, the instructions comprising:
   code for causing a base station to receive an acknowledgement/negative acknowledgement that is physical uplink control channel Format 3 with cell-specific symbol-level phase hopping from the user equipment, wherein the cell-specific symbol-level phase hopping is based at least in part on a cell-specific cyclic shift generated by the user equipment;
   code for causing the base station to perform a corresponding despreading according to an applied hopping phase for each single-carrier frequency division multiplexing symbol; and
   code for causing the base station to decode the acknowledgement/negative acknowledgement.

29. The wireless device of claim 12, wherein the cell-specific cyclic shift is generated at least based on a symbol index l or a slot index $n_s$, which is given by $n_{cs}^{cell}(n_s,l)$.

30. The wireless device of claim 29, wherein the cell-specific symbol-level phase hopping is generated based on $\lfloor n_{cs}^{cell}(n_s,l)/G \rfloor$, where G is an integer.

31. The wireless device of claim 29, wherein the cell-specific symbol-level cyclic-shift hopping is given by $n_{cs}^{cell}(n_s,l)$.

32. The wireless device of claim 12, wherein the instructions stored in the memory are further executable by the processor to:
   generate a theta sequence for the cell-specific symbol-level phase hopping; and
   apply the theta sequence to each single-carrier frequency division multiplexing data symbol as part of an orthogonal cover code.

* * * * *